(12) United States Patent
Wang et al.

(10) Patent No.: US 11,755,675 B2
(45) Date of Patent: *Sep. 12, 2023

(54) METHOD AND APPARATUS FOR MANAGING REGION TAG

(71) Applicant: ALIBABA GROUP HOLDING LIMITED, Grand Cayman (KY)

(72) Inventors: Yu Wang, Hangzhou (CN); Jiqiu Xu, Hangzhou (CN); Rui Wang, Hangzhou (CN); Wanli Min, Hangzhou (CN); Liang Zhu, Hangzhou (CN); Shuya Ye, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,185

(22) Filed: Aug. 3, 2021

(65) Prior Publication Data

US 2021/0374204 A1 Dec. 2, 2021

Related U.S. Application Data

(63) Continuation of application No. 15/641,430, filed on Jul. 5, 2017, now Pat. No. 11,113,354, which is a
(Continued)

(51) Int. Cl.
*G06F 7/00* (2006.01)
*G06F 16/9537* (2019.01)
(Continued)

(52) U.S. Cl.
CPC .... *G06F 16/9537* (2019.01); *G06F 16/24578* (2019.01); *G06F 16/285* (2019.01); *G06F 16/29* (2019.01); *G06Q 50/01* (2013.01)

(58) Field of Classification Search
CPC ............... G06F 16/9537; G06F 16/285; G06F 16/24578; G06F 16/29; G06F 16/23;
(Continued)

(56) References Cited

U.S. PATENT DOCUMENTS 6,636,848 B1 10/2003 Aridor et al.
8,339,417 B2 12/2012 Stroila et al.
(Continued)

FOREIGN PATENT DOCUMENTS

CN 102047249 A 5/2011
CN 202650258 U 1/2013
(Continued)

OTHER PUBLICATIONS

First Search Report for Chinese Application No. 201510007302.6, dated Oct. 15, 2018 (2 page).
(Continued)

*Primary Examiner* — Mohammad A Sana (57) ABSTRACT

A method for managing a region tag comprises: acquiring region identifier information of a geographic region; acquiring an attribute evaluation tag of the geographic region by a user in the geographic region and a time identifier of the attribute evaluation tag; integrating the region identifier information, the attribute evaluation tag, and the time identifier thereof into a region tag of the geographic region; clustering region tags to generate a region time period tag of the geographic region for a time period based on that each region tag comprises the region identifier information of the geographic region and a time identifier within the time period, wherein the region time period tag of the geographic region for the time period corresponds to a function attribute of the geographic region for the time period; and outputting region time period tags of the geographic region for time periods, respectively.

20 Claims, 3 Drawing Sheets

Related U.S. Application Data continuation of application No. PCT/CN2015/099541, filed on Dec. 29, 2015.

(51) Int. Cl.
*G06F 16/29* (2019.01)
*G06F 16/28* (2019.01)
*G06F 16/2457* (2019.01)
*G06Q 50/00* (2012.01)

(58) Field of Classification Search
CPC ....... G06F 16/51; G06F 16/583; G06Q 50/01; H04W 4/029; H04W 4/185
See application file for complete search history.

(56) References Cited

U.S. PATENT DOCUMENTS

| | | | |
|---|---|---|---|
| 8,861,804 B1* | 10/2014 | Johnson | G06F 16/23 |
| | | | 382/218 |
| 9,389,085 B2 | 7/2016 | Khorashadi et al. | |
| 2003/0004693 A1 | 1/2003 | Neimam et al. | |
| 2007/0233385 A1 | 10/2007 | Dicke et al. | |
| 2008/0172362 A1 | 7/2008 | Shacham et al. | |
| 2009/0030916 A1 | 1/2009 | Andersen et al. | |
| 2009/0216438 A1 | 8/2009 | Shafer | |
| 2009/0248688 A1 | 10/2009 | Kim et al. | |
| 2010/0008337 A1 | 1/2010 | Bajko | |
| 2010/0076968 A1* | 3/2010 | Boyns | H04W 4/185 |
| | | | 715/825 |
| 2011/0022982 A1* | 1/2011 | Takaoka | G06F 3/04883 |
| | | | 715/810 |
| 2011/0081919 A1 | 4/2011 | Das et al. | |
| 2011/0137549 A1 | 6/2011 | Gupta et al. | |
| 2011/0137919 A1 | 6/2011 | Ryu et al. | |
| 2012/0021762 A1 | 1/2012 | Garin et al. | |
| 2012/0047184 A1 | 2/2012 | Purdy | |
| 2012/0066275 A1 | 3/2012 | Gerstner et al. | |
| 2012/0158633 A1 | 6/2012 | Eder | |
| 2012/0158687 A1 | 6/2012 | Fang et al. | |
| 2012/0323931 A1* | 12/2012 | Buchmueller | G06F 16/9537 |
| | | | 707/E17.05 |
| 2013/0332273 A1 | 12/2013 | Gu et al. | |
| 2014/0137017 A1 | 5/2014 | Sharma et al. | |
| 2015/0293997 A1 | 10/2015 | Smith et al. | |
| 2015/0324464 A1 | 11/2015 | Fan et al. | |
| 2015/0331877 A1 | 11/2015 | Lou et al. | |
| 2016/0029176 A1* | 1/2016 | Marti | H04W 4/18 |
| | | | 455/456.3 |

FOREIGN PATENT DOCUMENTS

| | | |
|---|---|---|
| CN | 103324706 A | 9/2013 |
| CN | 103838602 A | 6/2014 |
| CN | 103971589 A | 8/2014 |
| CN | 103995847 A | 8/2014 |
| CN | 103995859 A | 8/2014 |

OTHER PUBLICATIONS

First Office Action for Chinese Application No. 201510007302.6, dated Oct. 23, 2018 with machine English Translation (14 page).
International Search Report and Written Opinion for Application No. PCT/CN2015/099541, dated Mar. 31, 2016, 9 pages.
PCT International Preliminary Report on Patentability dated Jul. 11, 2017, issued in international Application No. PCT/CN2015/099541 (4 pages).

\* cited by examiner

METHOD AND APPARATUS FOR MANAGING REGION TAG

CROSS-REFERENCE TO RELATED APPLICATIONS

This application is a continuation application of U.S. patent application Ser. No. 15/641,430, filed on Jul. 5, 2017, which is a continuation application of International Patent Application No. PCT/CN2015/099541, filed on Dec. 29, 2015, which is based on and claims priority to and benefits of Chinese Patent Application No. CN201510007302.6, filed on Jan. 7, 2015. The entirety of all of the aforementioned applications is incorporated herein by reference.

TECHNICAL FIELD

The present application relates to the field of geographic position information, and in particular, to a method for managing a region tag. The present application also relates to an apparatus for managing a region tag.

BACKGROUND ART

With rapid development of communication technologies and information technologies, the recognition and usage of electronic maps are constantly growing. Electronic maps are widely used in various forms in the public as well as industries and fields, especially in the communication industry and industries related to geographic information (including map providers). For the public, electronic maps can provide convenient solutions in various aspects such as living, shopping, work, travel, and navigation, thus becoming an indispensable tool. For an enterprise (e.g., a business), electronic maps have become a new marketing method and means, of which an important application is marking geographic position information, a region tag (which generally refers to a common attribute of regions at the granularity of community level, e.g., residential building, shopping mall, or office building), and the like on an electronic map, and quickly recommending them to the public, so that the enterprise can reach potential customers quickly and effectively, thereby helping the enterprise to gain an advantage in precision marketing.

At present, in the communication industry and industries related to geographic information (including map providers), a static region tag management method is employed, e.g., a function determination criterion for a geographic region of communication operators (such as China Mobile and Unicom), in which a geographic region is divided according to function attributes, and region tags of regions after the division are determined according to function attributes of the regions. The region tags are all static tags, and cannot change with the function attributes of the regions.

The region tag management method provided in the prior art has obvious shortcomings.

The prior art provides a static region tag management method, which adds respective static tags to regions according to different function attributes thereof. However, in reality, the function attribute of each region may often change, and different function attributes are presented in different time periods. Using the Central District of Hong Kong as an example, in daytime, a lot of businessmen and public officials gather in this district, who go into and out of various office buildings and government departments, and at this time, the region tag of this district is office building or business. After nightfall, ground floor bars and nightclubs in this district become the dominant attraction to people, and at this time, the region tag of this district can be leisure and entertainment. A similar situation may occur in the region of Sanlitun Soho buildings in Beijing. The region tag of this region in daytime is office building, while the region tag at night is bar. Therefore, the region tag management method provided in the prior art is one-sided to some degree, failing to comprehensively consider function attributes of a geographic region and failing to adaptively adjust region tags with time, thus having the shortcomings.

SUMMARY

The present application provides a method for managing a region tag, which can solve the problem that an existing method for managing a region tag is one-sided and incapable of dynamic update. The present application also relates to an apparatus for managing a region tag.

The present application provides a method for managing a region tag, including:

acquiring region identifier information of a geographic region;

acquiring an attribute evaluation tag of the geographic region by a user whose geographic position is in the geographic region and a time identifier of the attribute evaluation tag;

integrating the region identifier information, the attribute evaluation tag, and the time identifier thereof into a region tag of the geographic region; and clustering region tags of the geographic region in a time domain comprising one or more time periods to generate a region time period tag of the geographic region for each time period.

Optionally, the step of acquiring an attribute evaluation tag of the geographic region by a user whose geographic position is in the geographic region and a time identifier of the attribute evaluation tag comprises:

acquiring social media data information of a user whose geographic position is in the geographic region; and obtaining, from the social media data information, evaluation information of the user for a function attribute of the geographic region, using the evaluation information as an attribute evaluation tag of the geographic region, obtaining a time of the attribute evaluation tag from the social media data information, and using the time as a time identifier.

Optionally, after the step of acquiring an attribute evaluation tag of the geographic region by a user whose geographic position is in the geographic region and a time identifier of the attribute evaluation tag, the method includes:

classifying, according to a function attribute of the geographic region as described by the attribute evaluation tag, attribute evaluation tags of the geographic region into at least one tag class; and normalizing attribute evaluation tags in each tag class, wherein attribute evaluation tags in the same attribute evaluation tag class are normalized to be the same attribute evaluation tag.

Optionally, after the step of acquiring an attribute evaluation tag of the geographic region by a user whose geographic position is in the geographic region and a time identifier of the attribute evaluation tag, the method includes:

scoring the attribute evaluation tag, and performing statistical analysis to obtain a score of each attribute evaluation tag.

Optionally, the step of scoring the attribute evaluation tag, and performing statistical analysis to obtain a score of each attribute evaluation tag comprises:

counting the number of attribute evaluation tags of the geographic region; and calculating, according to the number of attribute evaluation tags, an occupancy rate of each attribute evaluation tag in attribute evaluation tags of the geographic region, and using the occupancy rate as the score of each attribute evaluation tag.

Optionally, after the step of acquiring an attribute evaluation tag of the geographic region by a user whose geographic position is in the geographic region and a time identifier of the attribute evaluation tag, the method further includes:

selecting at least one attribute evaluation tag with the highest score as an attribute evaluation tag of the geographic region.

Optionally, after the step of acquiring an attribute evaluation tag of the geographic region by a user whose geographic position is in the geographic region and a time identifier of the attribute evaluation tag, the method further includes:

separately determining whether the score of each attribute evaluation tag of the geographic region is lower than a preset threshold;

if yes, eliminating the attribute evaluation tag from attribute evaluation tags of the geographic region; and if no, using the attribute evaluation tag as an attribute evaluation tag of the geographic region.

Optionally, the step of integrating the region identifier information, the attribute evaluation tag, and the time identifier thereof into a region tag of the geographic region includes:

separately determining whether each attribute evaluation tag of the geographic region has a respective time identifier;

if yes, integrating the attribute evaluation tag and the time identifier thereof, as well as the region identifier information into a database, and generating a region tag of the geographic region; and if no, eliminating the attribute evaluation tag from attribute evaluation tags of the geographic region.

Optionally, if the determination result of the separately determining whether each attribute evaluation tag of the geographic region has a respective time identifier is yes, correspondingly, the sub-step of integrating the attribute evaluation tag and the time identifier thereof, as well as the region identifier information into a database comprises:

writing a data combination of the attribute evaluation tag and the time identifier thereof, as well as the region identifier information as a data record into a data table of the database, to serve as a region tag of the geographic region;

wherein, a primary key in the data table is the region identifier information.

Optionally, after the step of integrating the region identifier information, the attribute evaluation tag, and the time identifier thereof into a region tag of the geographic region, the method includes:

counting the number of region tags in region tags of the geographic region; and calculating, according to the number of region tags, an occupancy rate of each region tag in the region tags of the geographic region.

Optionally, after the step of integrating the region identifier information, the attribute evaluation tag, and the time identifier thereof into a region tag of the geographic region, the method further includes:

separately determining whether the occupancy rate of each region tag of the geographic region is higher than a preset threshold;

if yes, maintaining the region tag as a region tag of the geographic region; and if no, eliminating the region tag from the region tags of the geographic region.

Optionally, the step of clustering region tags of the geographic region in a time domain includes:

fuzzifying date information recorded in the region tags of the geographic region;

sequencing the region tags according to a chronological order of time identifiers recorded in the region tags; and clustering the sequenced region tags in the time domain comprising one or more time periods to generate a region time period tag of the geographic region for each time period;

wherein the region time period tag is a description about a function attribute of the geographic region for each time period; one region time period tag corresponds to at least two region tags, and one region time period tag corresponds to at least one time period.

Optionally, the step of clustering region tags of the geographic region in a time domain further includes:

with a clustering centroid of time periods corresponding to a region time period tag of the geographic region as an origin, and a normal distribution $\sigma$ of region tags as a radius, using a time period covered by a time range formed according to the origin and the radius as the time period of the region tag;

wherein the clustering centroid includes: a median of time periods of the region time period tag, or an arithmetic mean value or a weighted mean value of time identifiers of the region tags corresponding to the region time period tag.

Optionally, after the step of clustering region tags of the geographic region in a time domain, the method includes:

determining whether the geographic region has a region time period tag in a time period;

if yes, keeping the region time period tag of the geographic region in the time period unchanged; and if no, using a default region tag as a region tag of the geographic region in the time period, and determining a region time period tag in the time period according to the region tag;

wherein the default region tag includes: the most common region tag of the geographic region.

Optionally, after the step of clustering region tags of the geographic region in a time domain, the method includes:

determining whether the geographic region has two or more region time period tags in a time period;

if yes, acquiring the number of region tags corresponding to each region time period tag of the geographic region in the time period, and selecting a region time period tag having the most common region tags as a region time period tag of the geographic region in the time period; or acquiring the total number of region tags corresponding to each region time period tag of the geographic region, and selecting a region time period tag having the most common region tags as a region time period tag of the geographic region in the time period.

Optionally, after the step of clustering region tags of the geographic region in a time domain, the method includes:

separately determining whether duration of each time period corresponding to a region time period tag of the geographic region is less than a preset threshold; and if yes, executing a greedy merging algorithm, to merge the time period into a longer time period that is adjacent to the time period, and acquiring a corresponding region time period tag in the longer time period as a region time period tag of the time period.

The present application further provides an apparatus for managing a region tag, including:

a region identifier information acquisition unit, configured to acquire region identifier information of a geographic region;

an attribute evaluation tag acquisition unit, configured to acquire an attribute evaluation tag of the geographic region by a user whose geographic position is in the geographic region and a time identifier of the attribute evaluation tag;

a region tag generation unit, configured to integrate the region identifier information, the attribute evaluation tag, and the time identifier thereof into a region tag of the geographic region; and a region tag clustering unit, configured to cluster region tags of the geographic region in a time domain comprising one or more time periods to generate a region time period tag of the geographic region for each time period.

Optionally, the apparatus for managing a region tag includes:

an attribute evaluation tag classification unit, configured to classify, according to a function attribute of the geographic region as described by the attribute evaluation tag, attribute evaluation tags of the geographic region into at least one tag class; and an attribute evaluation tag normalization unit, configured to normalize attribute evaluation tags in each tag class, wherein attribute evaluation tags in the same attribute evaluation tag class are normalized to be the same attribute evaluation tag.

Optionally, the apparatus for managing a region tag includes:

an attribute evaluation tag score acquisition unit, configured to score the attribute evaluation tag, and perform statistical analysis to obtain a score of each attribute evaluation tag.

Optionally, the apparatus for managing a region tag includes:

a first attribute evaluation tag determination unit, configured to select at least one attribute evaluation tag with the highest score as an attribute evaluation tag of the geographic region.

Optionally, the apparatus for managing a region tag includes:

a second attribute evaluation tag determination unit, configured to separately determine whether the score of each attribute evaluation tag of the geographic region is lower than a preset threshold;

if yes, eliminate the attribute evaluation tag from attribute evaluation tags of the geographic region; and if no, use the attribute evaluation tag as an attribute evaluation tag of the geographic region.

Optionally, the region tag generation unit includes:

an attribute evaluation tag determination subunit, configured to separately determine whether each attribute evaluation tag of the geographic region has a respective time identifier; and if yes, turn to a region tag integration subunit;

where the region tag integration subunit is configured to integrate the attribute evaluation tag and the time identifier thereof, as well as the region identifier information into a database, and generate a region tag of the geographic region; and if no, turn to an attribute evaluation tag filtering subunit;

where the attribute evaluation tag filtering subunit is configured to eliminate the attribute evaluation tag from attribute evaluation tags of the geographic region.

Optionally, the apparatus for managing a region tag includes:

a region tag number counting unit, configured to count the number of region tags in region tags of the geographic region; and an occupancy rate calculation unit, configured to calculate, according to the number of region tags, an occupancy rate of each region tag in the region tags of the geographic region.

Optionally, the apparatus for managing a region tag includes:

a region tag determination unit, configured to separately determine whether the occupancy rate of each region tag of the geographic region is higher than a preset threshold;

if yes, maintain the region tag as a region tag of the geographic region; and if no, eliminate the region tag from the region tags of the geographic region.

Optionally, the region tag clustering unit includes:

a date information processing subunit, configured to fuzzify date information recorded in the region tags of the geographic region;

a region tag sequencing subunit, configured to sequence the region tags according to a chronological order of time identifiers recorded in the region tags; and a region tag clustering subunit, configured to cluster the sequenced region tags in the time domain comprising one or more time periods to generate a region time period tag of the geographic region for each time period;

wherein the region time period tag is a description about a function attribute of the geographic region for each time period; one region time period tag corresponds to at least two region tags, and one region time period tag corresponds to at least one time period.

Optionally, the region tag clustering unit further includes:

a region tag time period determining subunit, configured to, with a clustering centroid of time periods corresponding to a region time period tag of the geographic region as an origin, and a normal distribution σ of region tags as a radius, use a time period covered by a time range formed according to the origin and the radius as the time period of the region tag;

wherein the clustering centroid includes: a median of time periods of the region time period tag, or an arithmetic mean value or a weighted mean value of time identifiers of the region tags corresponding to the region time period tag.

Optionally, the apparatus for managing a region tag includes:

a first region time period tag determination unit, configured to determine whether the geographic region has a region time period tag in a time period;

if yes, keep the region time period tag of the geographic region in the time period unchanged; and if no, use a default region tag as a region tag of the geographic region in the time period, and determine a region time period tag in the time period according to the region tag;

wherein the default region tag includes: the most common region tag of the geographic region.

Optionally, the apparatus for managing a region tag includes:

a second region time period tag determination unit, configured to determine whether the geographic region has two or more region time period tags in a time period;

if yes, acquire the number of region tags corresponding to each region time period tag of the geographic region in the time period, and select a region time period tag having the most common region tags as a region time period tag of the geographic region in the time period; or acquire the total number of region tags corresponding to each region time period tag of the geographic region, and select a region time period tag having the most common region tags as a region time period tag of the geographic region in the time period.

Optionally, the apparatus for managing a region tag includes:

a third region time period tag determination unit, configured to separately determine whether duration of each time period corresponding to a region time period tag of the geographic region is less than a preset threshold; and if yes, execute a greedy merging algorithm, to merge the time period into a longer time period that is adjacent to the time period, and acquire a corresponding region time period tag in the longer time period as a region time period tag of the time period.

Compared with the prior art, the present application has at least the following advantages:

A method for managing a region tag provided by the present application includes: acquiring region identifier information of a geographic region; acquiring an attribute evaluation tag of the geographic region by a user whose geographic position is in the geographic region and a time identifier of the attribute evaluation tag; integrating the region identifier information, the attribute evaluation tag, and the time identifier thereof into a region tag of the geographic region; and clustering region tags of the geographic region in a time domain comprising one or more time periods to generate a region time period tag of the geographic region for each time period.

In the method for managing a region tag provided by the present application, a time domain dimension is added for the region tag of the geographic region, and region tags of the regions are clustered in a time domain, to generate corresponding region time period tags of the geographic region in different time periods, realizing the dynamic setting of the region time period tag in the time domain dimension, thus becoming more comprehensive. In addition, the method can update in real time corresponding region time period tags of the geographic region in different time periods according to the update of a data source, realizing the dynamic update of the region time period tag of the geographic region, thereby more prompt and having higher accuracy.

DETAILED DESCRIPTION

The following description illustrates details of the present application. However, the present application can be implemented in other manners different from the manner described here, and those skilled in the art may carry out similar promotion without departing from the connotation of the present application. Therefore, the present application is not limited by the implementations disclosed below.

The present application provides a method for managing a region tag, and the present application further provides an apparatus for managing a region tag.

Figure 1:
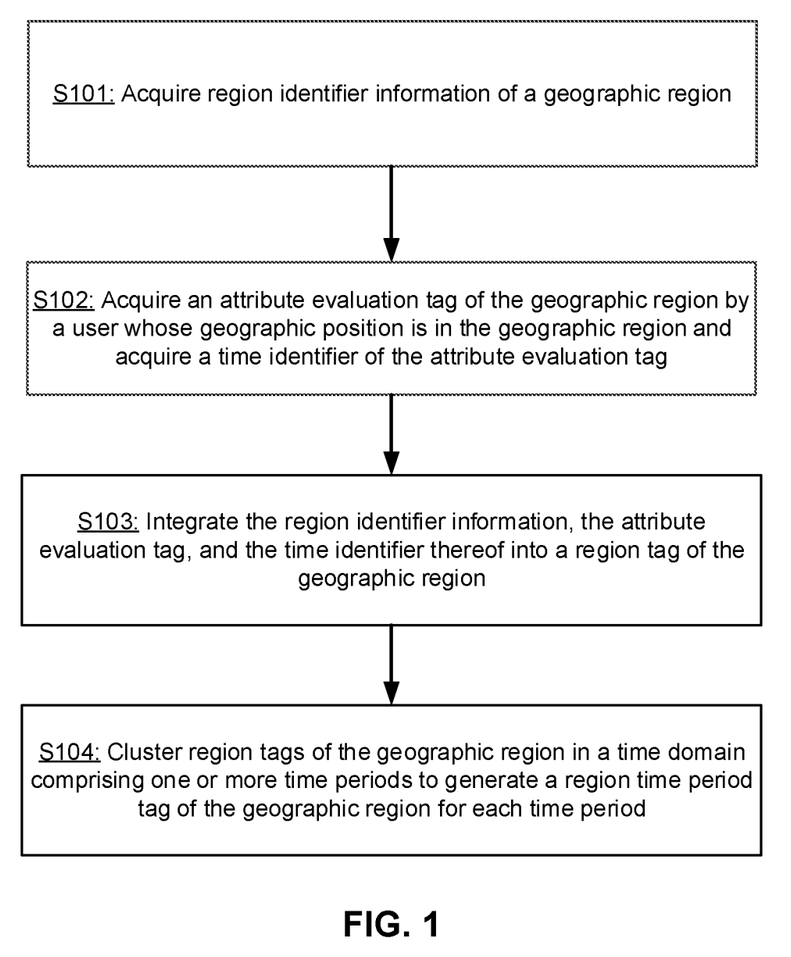
FIG. 1 is a processing flowchart of a method for managing a region tag according to an embodiment of the present application.

An embodiment of the method for managing a region tag is as follows:

With reference to FIG. 1, FIG. 1 shows a processing flowchart of a method for managing a region tag provided in this embodiment.

The method for managing a region tag provided in this embodiment and steps thereof are described hereinafter with reference to FIG. 1. In addition, an example sequential relationship among the steps of the method for managing a region tag provided in this embodiment is shown with reference to FIG. 1. The method and steps described in FIG. 1 may be implemented by the device, apparatus, or system described below with reference to FIG. 2 or FIG. 3.

The present disclosure provides a method for managing a region tag. The method adds a time domain dimension for a region tag of a geographic region, and can realize the dynamic updating of the region tag of the geographic region. Example steps are as follows:

Step S101: acquiring region identifier information of a geographic region.

The geographic region includes, for example, a range of an administrative region, a coverage area of a building, a range of a geographic area such as Sanlitun, Wanda Plaza, community xx, or a geographic area corresponding to a region on a map.

The region identifier information refers to basic geographic information of the geographic region acquired from a geographic information database.

The geographic basic information includes of administrative region information, a building name, and a region name or region description of a geographic region. For example, region identifier information of the Sanlitun region is Sanlitun, and region identifier information of the Wanda Plaza region is Wanda Plaza.

Step S102: acquiring an attribute evaluation tag of the geographic region by a user whose geographic position is in the geographic region and acquiring a time identifier of the attribute evaluation tag. Here, "is in the geographic region" may include a past, a present, or a future state of the user being in the geographic region.

According to Step S101, after the region identifier information of the geographic region is acquired, an attribute evaluation tag of the geographic region by a user whose geographic position is in the geographic region and a time identifier of the attribute evaluation tag are acquired in this step. The attribute evaluation tag and the time identifier may be acquired from various devices or systems, such as a device associated with the user (e.g., a mobile device used by the user), a connected device (e.g., a server coupled to a mobile device used by the user and configured to store the evaluation tag and time identifier), etc.

The attribute evaluation tag refers to evaluation information, in social media data information of the user, for evaluating a function attribute of the geographic region. For example, when in a geographic region of Sanlitun Soho buildings, a user posts a piece of Weibo information in Weibo, where the Weibo information includes evaluation information of the user for a function attribute of the geographic region, and the evaluation information may refer to or be "office building" or "bar." If the user posts the Weibo information in office hours of a workday, the attribute evaluation tag can be "office building," and if the user posts the Weibo information at night or on a holiday, the attribute evaluation tag of the geographic region can be "bar."

The time identifier includes date information and time information (e.g., a timestamp) corresponding to the attribute evaluation tag. In this embodiment, the time identifier only refers to the time information (timestamp) in the time identifier, such as a timestamp in the Weibo information posted by the user.

In this embodiment, before the evaluation information of the user for the function attribute of the geographic region is acquired, first of all, geographic position information of the user is acquired by using a GPS signal or a base station signal; and it is determined, based on the geographic position information, whether the user is located in the geographic region. If yes, the evaluation information by the user of the function attribute of the geographic region is acquired, that is, the attribute evaluation tag by the user, whose geographic position is located in the geographic region, of the geographic region is acquired.

The above determination may be made based on the fact that a lot of users mask geographic position information when posting Weibo information, or geographic position information of users cannot be acquired. The above determination can filter out attribute evaluation tags of the users who do not have geographic position information.

If it is determined, according to the geographic position information, that the user is located in the geographic region, an attribute evaluation tag by the user of the geographic region and a time identifier of the attribute evaluation tag are acquired. For example, evaluation information by the user of a function attribute of the geographic region is obtained from the social media data information, the evaluation information is used as an attribute evaluation tag of the geographic region, a time of the attribute evaluation tag is obtained from the social media data information, and the time is used as a time identifier.

In this embodiment, after the attribute evaluation tag of the geographic region and the time identifier thereof are acquired, the method further includes a step of normalizing the attribute evaluation tags and filtering the attribute evaluation tags, which can be implemented as follows:

1) normalizing the attribute evaluation tags.

In this embodiment, the normalizing the attribute evaluation tags can be implemented as follows:

attribute evaluation tags of the geographic region are classified, according to a function attribute of the geographic region as described by the attribute evaluation tag, into at least one tag class; and attribute evaluation tags in each tag class are normalized, where attribute evaluation tags in the same attribute evaluation tag class are normalized to be the same attribute evaluation tag.

The above step can normalize attribute evaluation tags for the same function attribute (that is, belonging to the same tag class) to be the same attribute evaluation tag, so that normalized attribute evaluation tags can better represent function attributes of the geographic region.

For example, attribute evaluation tags such as "bar A", "bar B", "tavern", and "pub" belonging to the same tag class are normalized to be the same attribute evaluation tag "bar".

2) scoring the attribute evaluation tag, and performing statistical analysis to obtain a score of each attribute evaluation tag.

In this embodiment, the following method is used to score the attribute evaluation tag and calculate the score:

a, counting the number of attribute evaluation tags of the geographic region; and b, calculating the occupancy rate of each attribute evaluation tag in attribute evaluation tags of the geographic region according to the number of attribute evaluation tags, and using the occupancy rate as the score of each attribute evaluation tag.

The occupancy rate is a ratio of the number of attribute evaluation tags to the total number of all the attribute evaluation tags.

For example, the number of attribute evaluation tags "breakfast" of a geographic region A is 500, the number of attribute evaluation tags "office building" is 5500, the number of attribute evaluation tags "restaurant" is 1000, and the number of attribute evaluation tags "bar" is 3000.

In this case, the occupancy rate of the attribute evaluation tag "breakfast" of the geographic region A is 500/(500+5500+3000+1000)=0.05, that is, a score of the attribute evaluation tag "breakfast" is 0.05.

The occupancy rate of the attribute evaluation tag "office building" is 5500/(500+5500+3000+1000)=0.55, that is, a score of the attribute evaluation tag "office building" is 0.55.

The occupancy rate of the attribute evaluation tag "restaurant" is 1000/(500+5500+3000+1000)=0.1, that is, a score of the attribute evaluation tag "restaurant" is 0.1.

The occupancy rate of the attribute evaluation tag "bar" is 3000/(6000+3000+1000)=0.3, that is, a score of the attribute evaluation tag "bar" is 0.3.

In addition, the score of the attribute evaluation tag may also be calculated by using other methods, for example, a score of each attribute evaluation tag of the geographic region can be calculated according to a weight of each attribute evaluation tag, which is not limited herein.

3) selecting at least one attribute evaluation tag with the highest score as an attribute evaluation tag of the geographic region.

The above step can select at least one attribute evaluation tag with the highest score as an attribute evaluation tag of the geographic region when the geographic region has too many attribute evaluation tags, e.g., including multiple attribute evaluation tags such as "breakfast", "office building", "restaurant", "bar", "community", "cinema", and "supermarket". For example, it can be limited that each geographic region has 2 to 4 attribute evaluation tags.

4) separately determining whether the score of each attribute evaluation tag of the geographic region is lower than a preset threshold;

if yes, the attribute evaluation tag is eliminated from attribute evaluation tags of the geographic region; and if no, the attribute evaluation tag is used as an attribute evaluation tag of the geographic region.

The above step can filter out abnormal data, that is, an attribute evaluation tag with a relatively low score.

For example: when the number of attribute evaluation tags "office building" of a geographic region B is 6000, the number of tags "bar" is 3000, and the number of tags "cyber cafe" is 10, it is generally considered that the attribute evaluation tags with tag "cyber cafe" are abnormal data, and the abnormal data is filtered out, thus ensuring the effectiveness of the attribute evaluation tag of the geographic region.

Step S103: integrating the region identifier information, the attribute evaluation tag, and the time identifier thereof into a region tag of the geographic region.

In Step S101, the region identifier information of the geographic region is acquired. In Step S102, the attribute evaluation tag by the user, whose geographic position information is located in the geographic region, of the geographic region and the time identifier of the attribute evaluation tag are acquired. In this step, according to the region identifier information, the attribute evaluation tag, and the time identifier thereof that are acquired in Steps S101 and S102, the region identifier information, the attribute evaluation tag, and the time identifier thereof are integrated into a region tag of the geographic region, which can be implemented as follows:

1) separately determining whether each attribute evaluation tag of the geographic region has a respective time identifier;

if yes, Step 2) is performed to integrate the attribute evaluation tag and the time identifier thereof as well as the region identifier information into a database and generate a region tag of the geographic region; and if no, the attribute evaluation tag is eliminated from attribute evaluation tags of the geographic region.

The determination can filter out invalid attribute evaluation tags, that is, filter out attribute evaluation tags that have no time identifier.

2) integrating the attribute evaluation tag and the time identifier thereof, as well as the region identifier information into a database, and generating a region tag of the geographic region.

This step is carried out on the premise that in Step 1), the determination result of the separately determining whether each attribute evaluation tag of the geographic region has a respective time identifier is yes, that is, the attribute evaluation tag has a time identifier.

For example, in this step, a data combination of the attribute evaluation tag and the time identifier thereof, as well as the region identifier information are integrated into the form of "region identifier information-time identifier-attribute evaluation tag", and is written as a data record into a data table of the database, to serve as a region tag of the geographic region.

In the data table, a primary key is the region identifier information.

The time identifier includes date information and time information (a timestamp such as 06:03) of the attribute evaluation tag; however, in this embodiment, only the timestamp in the time identifier is integrated with the attribute evaluation tag and the region identifier information.

Using the foregoing geographic region A as an example, an example of each region tag of the geographic region A is listed as follows:

a region tag corresponding to the attribute evaluation tag "breakfast": "geographic region A-06:03-breakfast";

a region tag corresponding to the attribute evaluation tag "office building": "geographic region A-8:30-office building";

a region tag corresponding to the attribute evaluation tag "restaurant": "geographic region A-11:05-restaurant"; and a region tag corresponding to the attribute evaluation tag "bar": "geographic region A-18:15-bar".

Apart from that, the integration process may also be implemented by using a method other than the method in this embodiment, which is not limited here.

3) counting the number of region tags in region tags of the geographic region, and calculating the occupancy rate of each region tag in the region tags of the geographic region according to the number of region tags;

and separately determining whether the occupancy rate of each region tag of the geographic region is higher than a preset threshold;

if yes, the region tag is maintained as a region tag of the geographic region; and if no, the region tag is eliminated from the region tags of the geographic region.

The threshold may be configured as a percentage, and for example, a percentage value between 25% and 40% is used as a preset threshold for the foregoing occupancy rate determination.

Using the foregoing geographic region A as an example, region tags of the geographic region A are:

"geographic region A-06:03-breakfast",
"geographic region A-06:04-breakfast",
. . .
"geographic region A-8:30-office building",
"geographic region A-8:32-office building",
. . .
"geographic region A-09:32-breakfast",
. . .
"geographic region A-11:05-restaurant",
. . .
"geographic region A-13:23-restaurant",
. . .
"geographic region A-17:45-restaurant",
. . .
"geographic region A-18:15-bar",
"geographic region A-18:16-bar",
. . .
"geographic region A-19:37-office building",
. . .
"geographic region A-20:14-restaurant",
. . .
"geographic region A-22:14-bar";

the total number of region tags corresponding to the attribute evaluation tag "breakfast" is 500;

the total number of region tags corresponding to the attribute evaluation tag "office building" is 5500;

the total number of region tags corresponding to the attribute evaluation tag "restaurant" is 1000; and the total number of region tags corresponding to the attribute evaluation tag "bar" is 3000.

In this case, the occupancy rate of the foregoing region tags is, by the same order:

$$500/(500+5500+3000+1000)*100\%=5\%;$$

$$5500/(500+5500+3000+1000)*100\%=55\%;$$

$$3000/(500+5500+3000+1000)*100\%=30\%; \text{ and}$$

$$1000/(500+5500+3000+1000)*100\%=10\%.$$

If the threshold for the occupancy rate determination is set as 28%, among the region tags of the geographic region A, all region tags corresponding to the attribute evaluation tag "breakfast" and all region tags corresponding to the attribute evaluation tag "restaurant" are filtered out.

Step S104: clustering region tags of the geographic region in a time domain comprising one or more time periods to generate a region time period tag of the geographic region for each time period.

In Step S103, the region identifier information, the attribute evaluation tag, and the time identifier thereof are integrated into a region tag of the geographic region. In this step, the acquired region tags of the geographic region are clustered in the time domain, and a region time period tag of the geographic region for each time period is generated, which can be implemented as follows:

1) fuzzifying date information recorded in the region tags of the geographic region.

The time identifier includes date information and a timestamp that are recorded in the region tag. Here, the date information recorded in the region tag is fuzzified, and the timestamp in the time identifier is used as a basis for sequencing the region tags in the following step.

2) sequencing the region tags according to a chronological order of time identifiers recorded in the region tags.

According to the region tags obtained after the processing in Step 1), the region tags are sequenced according to a chronological order of the timestamps.

Using the foregoing geographic region A as an example, among region tags of the geographic region A, region tags corresponding to the attribute evaluation tag "breakfast" are sequenced as follows:

"geographic region A-06:03-breakfast",
"geographic region A-06:04-breakfast",
. . .
"geographic region A-09:32-breakfast";

region tags corresponding to the attribute evaluation tag "office building" are sequenced as follows:

"geographic region A-8:30-office building",
"geographic region A-8:32-office building",
. . .
"geographic region A-19:37-office building";

region tags corresponding to the attribute evaluation tag "restaurant" are sequenced as follows:

"geographic region A-11:05-restaurant",
. . .
"geographic region A-13:23-restaurant",
"geographic region A-17:45-restaurant",
. . .
"geographic region A-20:14-restaurant";

region tags corresponding to the attribute evaluation tag "bar" are sequenced as follows:

"geographic region A-18:15-bar",
"geographic region A-18:16-bar",
. . .
"geographic region A-22:14-bar".

3) clustering the sequenced region tags in the time domain comprising one or more time periods to generate a region time period tag of the geographic region for each time period.

The region time period tag is a description about a function attribute of the geographic region for each time period; one region time period tag corresponds to at least two region tags, and one region time period tag corresponds to at least one time period.

Using the foregoing geographic region A as an example, region tags of the geographic region A are as follows:

region tags corresponding to the attribute evaluation tag "breakfast":

"geographic region A-06:03-breakfast",
"geographic region A-06:04-breakfast",
. . .
"geographic region A-09:32-breakfast";

region tags corresponding to the attribute evaluation tag "office building":

"geographic region A-8:30-office building",
"geographic region A-8:32-office building",
. . .
"geographic region A-19:37-office building";

region tags corresponding to the attribute evaluation tag "restaurant":

geographic region A-11:05-restaurant",
. . .
"geographic region A-13:23-restaurant",
"geographic region A-17:45-restaurant",
. . .
"geographic region A-20:14-restaurant";

region tags corresponding to the attribute evaluation tag "bar":

"geographic region A-18:15-bar",
"geographic region A-18:16-bar",
. . .
"geographic region A-22:14-bar".

The foregoing region tags are clustered in the time domain, and region time period tags of the geographic region A in different time periods are generated, which are as follows:

"geographic region A-06:03~09:32-breakfast";
"geographic region A-8:30~19:37-office building";
"geographic region A-11:05~13:23-restaurant";
"geographic region A-17:45~20:14-restaurant"; and
"geographic region A-18:15~22:14-bar".

4) with a clustering centroid of time periods corresponding to a region time period tag of the geographic region as an origin, and a normal distribution σ of region tags corresponding to the region time period tag as a radius, forming a time range of the region time period tag, and using a time period covered by the time range as the time period of the region tag.

In this embodiment, with a median of time periods of the region time period tag as an origin, and the normal distribution σ of region tags corresponding to the region time period tag as a radius, a circular time range is formed, and a time period covered by the circular time range is used as the time period of the region tag.

The above step can, for each region time period tag, determine, according to a time period determined by using a normal distribution σ of region tags corresponding to each region time period tag of the time period as a radius, an impact degree or a weight degree of each region time period tag in a time period.

In addition, the clustering centroid may also be determined by using other methods, e.g., an arithmetic mean value or a weighted mean value of time identifiers of the region tags corresponding to the region time period tag, which is not limited here.

After the foregoing step of clustering region tags of the geographic region in a time domain comprising one or more time periods to generate a region time period tag of the geographic region for each time period, this embodiment further includes a time domain correction step, and the time domain correction can be carried out for some special cases, for example, for a time period that does not have a corresponding region time period tag; for a time period that has two or more region time period tags, or for a time period of which the duration is extremely short.

For example, the time domain correction step includes:

a. Time domain correction for a time period that does not have a corresponding region time period tag.

In this embodiment, by using a preset time period as a segmentation unit, the time period of the geographic region is sequentially segmented non-repeatedly in the time domain, and it is determined whether the geographic region has a region time period tag in each time segment (the preset time period);

if yes, the region time period tag of the geographic region in the preset time period is kept unchanged; and if no, a default region tag is used as a region tag of the geographic region in the preset time period, and a region time period tag of the geographic region in the preset time period is determined according to the region tag.

In this embodiment, the default region tag refers to the most common region tag of the geographic region. In addition, the default region tag may also be another region time period tag. For example, a region tag corresponding to a region time period tag corresponding to a time period with the longest duration is used as the default region tag, which is not limited here.

Besides, the default region tag may be used as saved data, and when data is abnormal, the default region tag is used as region time period tags of the geographic region in all time periods.

Using the foregoing geographic region A as an example, region time period tags of the geographic region A in different time periods are as follows:

"geographic region A-06:03~09:32-breakfast";
"geographic region A-8:30~19:37-office building";
"geographic region A-11:05~13:23-restaurant";
"geographic region A-17:45~20:14-restaurant"; and
"geographic region A-18:15~22:14-bar".

The geographic region does not have a corresponding region time period tag in the time period "22:14~00:00", this time period is sequentially segmented, by using 5 minutes as a segmentation unit, into time segments having a duration of 5 minutes in the time domain, and a region time period tag of the geographic region in each 5-minute time segment is determined.

According to the determination result, the region tag "geographic region A-xx:xx-office building" as the most common region tag of the geographic region is used as the region tag in the time period "22:14~00:00", and it is determined that a region time period tag in the time period "22:14~00:00" is: "geographic region A-22:14~00:00-office building".

In addition, the sub-step of time domain correction for a time period that does not have a corresponding region time period tag may also be implemented by using another method, which is not limited here.

b. Time domain correction for a time period having two or more region time period tags.

According to that a preset time period is used as a segmentation unit in Step a, in this embodiment, each time segment, i.e., the preset time period, is generated by using a preset time period as a segmentation unit, and in this step, it is determined whether the geographic region has two or more region time period tags in the preset time period; and if yes, the number of region tags corresponding to each region time period tag of the geographic region in the time period is acquired, and the region time period tag having the most common region tags is selected as a region time period tag of the geographic region in the preset time period.

In addition, the foregoing process may also be implemented by using another method. For example, the total number of region tags corresponding to each region time period tag of the geographic region is acquired, and the region time period tag having the most common region tags is selected as a region time period tag of the geographic region in the time period, which is not limited here.

c. Time domain correction for a time period whose duration is less than a preset threshold.

It can be separately determined whether the duration of each time period corresponding to a region time period tag of the geographic region is less than a preset threshold; and if yes, a greedy merging algorithm is executed, to merge the time period into a longer time period that is adjacent to the time period, and a corresponding region time period tag in the longer time period is used as a region time period tag of the time period.

For example, a value with a time segment length between 15 and 30 minutes is used as the preset threshold for the determination, and all time periods whose duration is less than the threshold are merged into longer time periods that are adjacent thereto, thus realizing time domain correction for time periods whose duration is less than the preset threshold.

Embodiments of the apparatus for managing a region tag are as follows:

In the foregoing embodiment, a method for managing a region tag is provided, and correspondingly thereto, the present application further provides an apparatus for managing a region tag.

Figure 2:
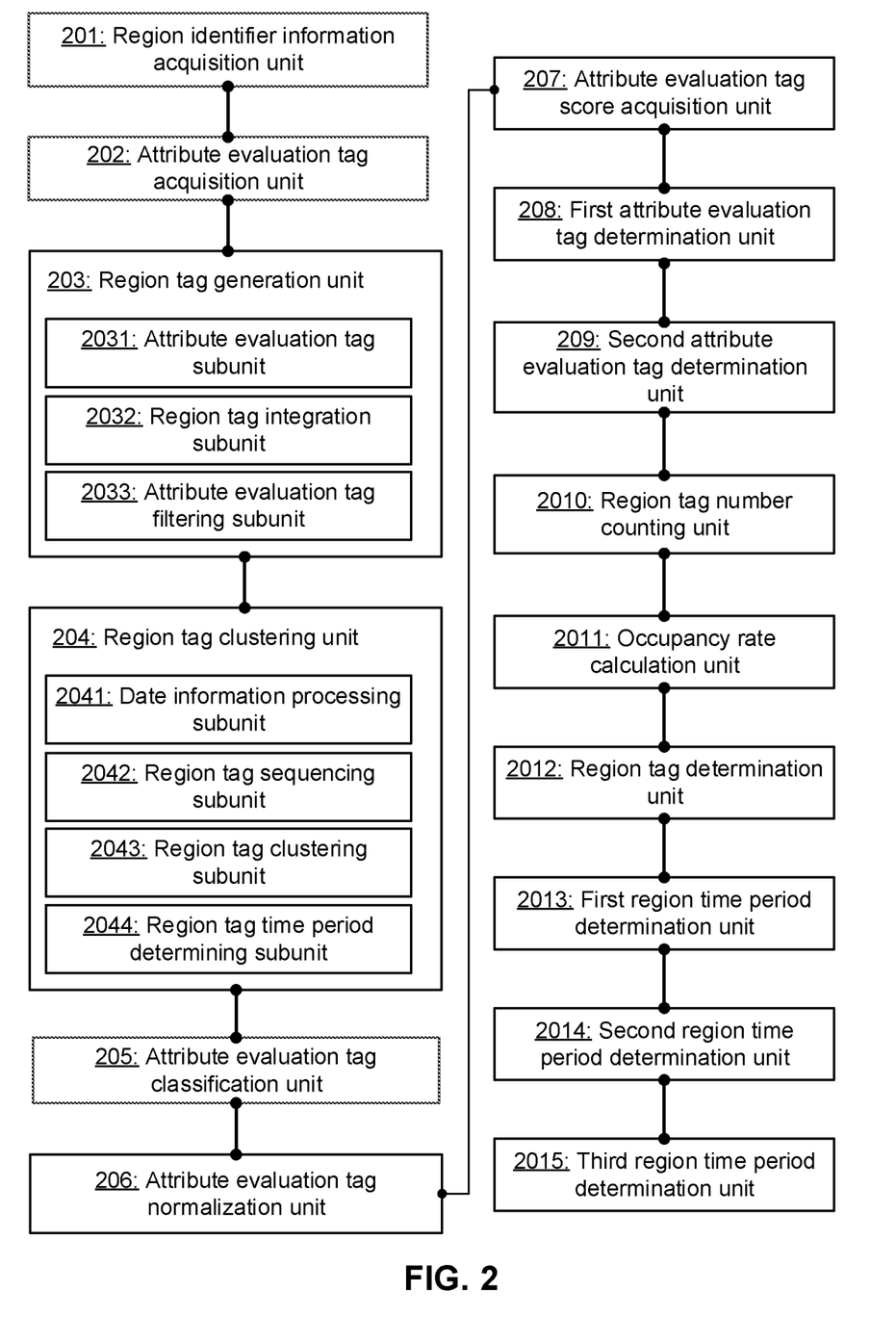
FIG. 2 is a schematic diagram of an apparatus for managing a region tag according to an embodiment of the present application.

Referring to FIG. 2, FIG. 2 shows a schematic diagram of an apparatus for managing a region tag according to this embodiment. The apparatus embodiment is similar to the method embodiment. Refer to corresponding descriptions in the method embodiment for related parts. The apparatus embodiment described below is merely illustrative.

The present application provides an apparatus for managing a region tag, including:

a region identifier information acquisition unit 201, configured to acquire region identifier information of a geographic region;

an attribute evaluation tag acquisition unit 202, configured to acquire an attribute evaluation tag of the geographic region by a user whose geographic position is in the geographic region and acquire a time identifier of the attribute evaluation tag;

a region tag generation unit 203, configured to integrate the region identifier information, the attribute evaluation tag, and the time identifier thereof into a region tag of the geographic region; and a region tag clustering unit 204, configured to cluster region tags of the geographic region in a time domain comprising one or more time periods to generate a region time period tag of the geographic region for each time period.

Optionally, the apparatus for managing a region tag includes:

an attribute evaluation tag classification unit 205, configured to classify, according to a function attribute of the geographic region as described by the attribute evaluation tag, attribute evaluation tags of the geographic region into at least one tag class; and an attribute evaluation tag normalization unit 206, configured to normalize attribute evaluation tags in each tag class, wherein attribute evaluation tags in the same attribute evaluation tag class are normalized to be the same attribute evaluation tag.

Optionally, the apparatus for managing a region tag includes:

an attribute evaluation tag score acquisition unit 207, configured to score the attribute evaluation tag, and perform statistical analysis to obtain a score of each attribute evaluation tag.

Optionally, the apparatus for managing a region tag includes:

a first attribute evaluation tag determination unit 208, configured to select at least one attribute evaluation tag with the highest score as an attribute evaluation tag of the geographic region.

Optionally, the apparatus for managing a region tag includes:

a second attribute evaluation tag determination unit 209, configured to separately determine whether the score of each attribute evaluation tag of the geographic region is lower than a preset threshold;

if yes, eliminate the attribute evaluation tag from attribute evaluation tags of the geographic region; and if no, use the attribute evaluation tag as an attribute evaluation tag of the geographic region.

Optionally, the region tag generation unit 203 includes:

an attribute evaluation tag determination subunit 2031, configured to separately determine whether each attribute evaluation tag of the geographic region has a respective time identifier; and if yes, turn to a region tag integration subunit 2032;

where the region tag integration subunit is configured to integrate the attribute evaluation tag and the time identifier thereof, as well as the region identifier information into a database to generate a region tag of the geographic region; and if no, turn to an attribute evaluation tag filtering subunit 2033;

where the attribute evaluation tag filtering subunit 2033 is configured to eliminate the attribute evaluation tag from attribute evaluation tags of the geographic region.

Optionally, the apparatus for managing a region tag includes:

a region tag number counting unit 2010, configured to count the number of region tags in region tags of the geographic region; and an occupancy rate calculation unit 2011, configured to calculate, according to the number of region tags, the occupancy rate of each region tag in the region tags of the geographic region.

Optionally, the apparatus for managing a region tag includes:

a region tag determination unit 2012, configured to separately determine whether the occupancy rate of each region tag of the geographic region is higher than a preset threshold;

if yes, maintain the region tag as a region tag of the geographic region; and if no, eliminate the region tag from the region tags of the geographic region.

Optionally, the region tag clustering unit 204 includes:

a date information processing subunit 2041, configured to fuzzify date information recorded in the region tags of the geographic region;

a region tag sequencing subunit 2042, configured to sequence the region tags according to a chronological order of time identifiers recorded in the region tags; and a region tag clustering subunit 2043, configured to cluster the sequenced region tags in the time domain comprising one or more time periods to generate a region time period tag of the geographic region for each time period;

wherein the region time period tag is a description about a function attribute of the geographic region for each time period; one region time period tag corresponds to at least two region tags, and one region time period tag corresponds to at least one time period.

Optionally, the region tag clustering unit 204 further includes:

a region tag time period determining subunit 2044, configured to, with a clustering centroid of time periods corresponding to a region time period tag of the geographic region as an origin, and a normal distribution σ of region tags as a radius, use a time period covered by a time range formed according to the origin and the radius as the time period of the region tag;

wherein the clustering centroid includes: a median of time periods of the region time period tag, or an arithmetic mean value or a weighted mean value of time identifiers of the region tags corresponding to the region time period tag.

Optionally, the apparatus for managing a region tag includes:

a first region time period tag determination unit 2013, configured to determine whether the geographic region has a region time period tag in a time period;

if yes, keep the region time period tag of the geographic region in the time period unchanged; and if no, use a default region tag as a region tag of the geographic region in the time period, and determine a region time period tag in the time period according to the region tag;

wherein the default region tag includes: the most common region tag of the geographic region.

Optionally, the apparatus for managing a region tag includes:

a second region time period tag determination unit 2014, configured to determine whether the geographic region has two or more region time period tags in a time period;

if yes, acquire the number of region tags corresponding to each region time period tag of the geographic region in the time period, and select a region time period tag having the most common region tags, as a region time period tag of the geographic region in the time period; or acquire the total number of region tags corresponding to each region time period tag of the geographic region, and select a region time period tag having the most common region tags as a region time period tag of the geographic region in the time period.

Optionally, the apparatus for managing a region tag includes:

a third region time period tag determination unit 2015, configured to separately determine whether duration of each time period corresponding to a region time period tag of the geographic region is less than a preset threshold; and if yes, execute a greedy merging algorithm, to merge the time period into a longer time period that is adjacent to the time period, and acquire a corresponding region time period tag in the longer time period as a region time period tag of the time period.

Figure 3:
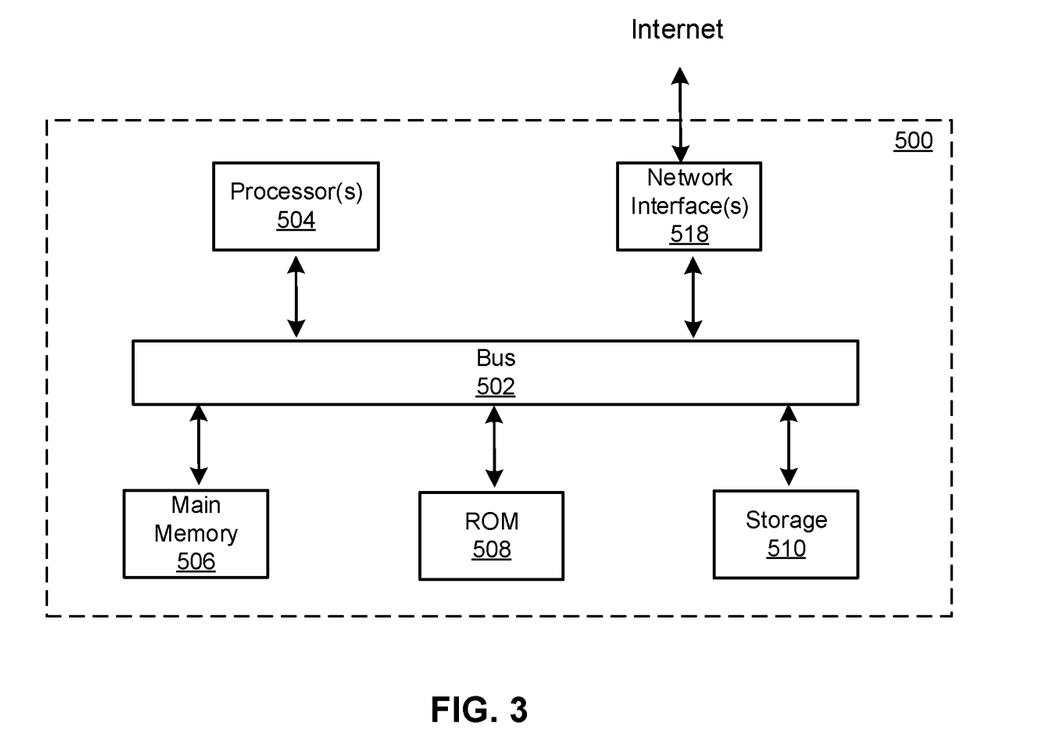
FIG. 3 illustrates a block diagram of an example computer system in which the embodiments described herein may be implemented.

FIG. 3 is a block diagram that illustrates a computer system 500 upon which the embodiments described herein may be implemented. The system 500 may correspond to the apparatus for managing a region tag described above with reference to FIG. 2. The computer system 500 includes a bus 502 or other communication mechanism for communicating information, one or more hardware processors 504 coupled with bus 502 for processing information. Hardware processor(s) 504 may be, for example, one or more general purpose microprocessors, one or more Central Processing Units (CPUs), etc.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the methods and/or process steps described herein. In alternative embodiments, hard-wired circuitry may be used in place of or in combination with software instructions.

The main memory 506, the ROM 508, and/or the storage 510 may include non-transitory computer readable storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Computer readable media may include permanent and volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to the computation device. Accordingly, the computer readable media may exclude transitory media, such as modulated data signals and carriers.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 may further include an I/O interface (not shown in the figure). The computer system 500 can send messages and receive data, including program code, through the network(s), network link, I/O interface, and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A method for managing a region tag, comprising:
   acquiring region identifier information of a geographic region;
   acquiring an attribute evaluation tag of the geographic region by a user whose geographic position is in the geographic region and a time identifier of the attribute evaluation tag;
   integrating the region identifier information, the attribute evaluation tag, and the time identifier thereof into a region tag of the geographic region;
   clustering one or more region tags to generate a region time period tag of the geographic region for a time period based on that each of the one or more region tags comprises the region identifier information of the geographic region and a time identifier within the time period, wherein the region time period tag of the geographic region for the time period corresponds to a function attribute of the geographic region for the time period, the function attribute of the geographic region is descriptive of functions that the geographic region serves, the function attribute of the geographic region comprises a first function attribute of the geographic region for a first time period and a second function attribute of the geographic region for a second time period, the first function attribute is different than the second function attribute, and the first time period is different than the second time period; and
   outputting one or more region time period tags of the geographic region for one or more time periods, respectively.

2. The method for managing a region tag according to claim 1, wherein the acquiring an attribute evaluation tag of the geographic region by a user whose geographic position is in the geographic region and a time identifier of the attribute evaluation tag comprises:
   acquiring social media data information of the user whose geographic position is in the geographic region; and
   obtaining, from the social media data information, evaluation information by the user of the function attribute of the geographic region, using the evaluation information as the attribute evaluation tag of the geographic region, obtaining a time of the attribute evaluation tag from the social media data information, and using the time as the time identifier.

3. The method for managing a region tag according to claim 1, after the acquiring an attribute evaluation tag of the geographic region by a user whose geographic position is in the geographic region and a time identifier of the attribute evaluation tag, further comprising:
  classifying attribute evaluation tags of the geographic region into at least one tag class, according to the function attribute of the geographic region; and
  normalizing attribute evaluation tags in each of the at least one tag class.

4. The method for managing a region tag according to claim 1, further comprising:
  scoring the attribute evaluation tag to obtain a score of the attribute evaluation tag, wherein the score of the attribute evaluation tag comprises a ratio of a number of the attribute evaluation tag to a total number of all attribute evaluation tags.

5. The method for managing a region tag according to claim 1, further comprising scoring the attribute evaluation tag to obtain a score of the attribute evaluation tag by:
  counting a number of attribute evaluation tags of the geographic region; and
  calculating, according to the number of attribute evaluation tags, an occupancy rate of the attribute evaluation tag in the attribute evaluation tags of the geographic region, and using the occupancy rate as the score of the attribute evaluation tag.

6. The method for managing a region tag according to claim 1, after the acquiring an attribute evaluation tag of the geographic region by a user whose geographic position is in the geographic region and a time identifier of the attribute evaluation tag, further comprising:
  selecting at least one attribute evaluation tag with a highest score as the attribute evaluation tag of the geographic region.

7. The method for managing a region tag according to claim 1, after the acquiring an attribute evaluation tag of the geographic region by a user whose geographic position is in the geographic region and a time identifier of the attribute evaluation tag, further comprising:
  scoring the attribute evaluation tag to obtain a score of the attribute evaluation tag;
  separately determining whether a score of each attribute evaluation tag of the geographic region is lower than a preset threshold;
  in response to determining that a score of an attribute evaluation tag of the geographic region is lower than the preset threshold, eliminating the attribute evaluation tag from attribute evaluation tags of the geographic region; and
  in response to determining that a score of an attribute evaluation tag of the geographic region is not lower than the preset threshold, using the attribute evaluation tag as the attribute evaluation tag of the geographic region.

8. The method for managing a region tag according to claim 1, wherein the integrating the region identifier information, the attribute evaluation tag, and the time identifier thereof into a region tag of the geographic region comprises:
  separately determining whether each attribute evaluation tag of the geographic region has a respective time identifier;
  in response to determining that an attribute evaluation tag of the geographic region has a respective time identifier, integrating the attribute evaluation tag, the respective time identifier thereof, and the region identifier information into a database, and generating the region tag of the geographic region; and
  in response to determining that an attribute evaluation tag of the geographic region does not have a respective time identifier, eliminating the attribute evaluation tag from attribute evaluation tags of the geographic region.

9. The method for managing a region tag according to claim 8, wherein in response to determining that an attribute evaluation tag of the geographic region has a respective time identifier, the integrating the attribute evaluation tag, the respective time identifier thereof, and the region identifier information into a database comprises:
  writing a data combination of the attribute evaluation tag, the respective time identifier thereof, and the region identifier information as a data record into a data table of the database, to serve as the region tag of the geographic region;
  wherein, a primary key in the data table is the region identifier information.

10. The method for managing a region tag according to claim 1, after the integrating the region identifier information, the attribute evaluation tag, and the time identifier thereof into a region tag of the geographic region, further comprising:
  counting a number of region tags of the geographic region; and
  calculating, according to the number of region tags, an occupancy rate of each region tag in the region tags of the geographic region.

11. The method for managing a region tag according to claim 10, after the integrating the region identifier information, the attribute evaluation tag, and the time identifier thereof into a region tag of the geographic region, further comprising:
  separately determining whether the occupancy rate of each region tag of the geographic region is higher than a preset threshold;
  in response to determining that an occupancy rate of a region tag of the geographic region is higher than the preset threshold, maintaining the region tag as the region tag of the geographic region; and
  in response to determining that an occupancy rate of a region tag of the geographic region is not higher than the preset threshold, eliminating the region tag from the region tags of the geographic region.

12. The method for managing a region tag according to claim 1, wherein clustering one or more region tags comprises:
  fuzzifying date information recorded in the one or more region tags of the geographic region;
  sequencing the one or more region tags according to a chronological order of time identifiers recorded in the region tags; and
  clustering the sequenced one or more region tags in the time domain comprising one or more time periods to generate a region time period tag of the geographic region for each time period;
  wherein one region time period tag corresponds to at least two region tags, and one region time period tag corresponds to at least one time period.

13. The method for managing a region tag according to claim 12, wherein the clustering one or more region tags further comprises:
  with a clustering centroid of time periods corresponding to a region time period tag of the geographic region as an origin, and a normal distribution $\sigma$ of the one or more region tags as a radius, using a time period covered by a time range formed according to the origin and the radius as the time period of the region tag;

wherein the clustering centroid comprises a median of time periods of the region time period tag, or an arithmetic mean value or a weighted mean value of time identifiers of the one or more region tags corresponding to the region time period tag.

14. The method for managing a region tag according to claim 12, after the clustering one or more region tags, further comprising:

determining whether the geographic region has a region time period tag in a time period;

in response to determining that the geographic region has a region time period tag in the time period, keeping the region time period tag of the geographic region in the time period unchanged; and in response to determining that the geographic region does not have a region time period tag in the time period, using a default region tag as a region tag of the geographic region in the time period, and determining a region time period tag in the time period according to the region tag;

wherein the default region tag comprises a most common region tag of the geographic region.

15. The method for managing a region tag according to claim 12, after the clustering one or more region tags, further comprising:

determining whether the geographic region has two or more region time period tags in a time period; and in response to determining that the geographic region has two or more region time period tags in a time period, performing at least one of:

acquiring a number of region tags corresponding to each region time period tag of the geographic region in the time period, and selecting a region time period tag having most common region tags as a region time period tag of the geographic region in the time period; or acquiring a total number of region tags corresponding to each region time period tag of the geographic region, and selecting a region time period tag having the most common region tags as a region time period tag of the geographic region in the time period.

16. The method for managing a region tag according to claim 12, after the clustering one or more region tags, further comprising:

separately determining whether a duration of each time period corresponding to a region time period tag of the geographic region is less than a preset threshold; and in response to determining that a duration of a time period corresponding to a region time period tag of the geographic region is less than a preset threshold, executing a greedy merging algorithm to merge the time period into a longer time period that is adjacent to the time period, and acquiring a corresponding region time period tag in the longer time period as a region time period tag of the time period.

17. A system for managing a region tag, comprising a processor and a non-transitory computer-readable storage medium storing instructions executable by the processor to cause the system to perform operations comprising:

acquiring region identifier information of a geographic region;

acquiring an attribute evaluation tag of the geographic region by a user whose geographic position is in the geographic region and a time identifier of the attribute evaluation tag;

integrating the region identifier information, the attribute evaluation tag, and the time identifier of the attribute evaluation tag into a region tag of the geographic region;

clustering one or more region tags to generate a region time period tag of the geographic region for a time period based on that each of the one or more region tags comprises the region identifier information of the geographic region and a time identifier within the time period, wherein the region time period tag of the geographic region for the time period corresponds to a function attribute of the geographic region for the time period, the function attribute of the geographic region is descriptive of functions that the geographic region serves, the function attribute of the geographic region comprises a first function attribute of the geographic region for a first time period and a second function attribute of the geographic region for a second time period, the first function attribute is different than the second function attribute, and the first time period is different than the second time period; and outputting one or more region time period tags of the geographic region for one or more time periods, respectively.

18. The system according to claim 17, wherein the operations further comprise:

classifying attribute evaluation tags of the geographic region into at least one tag class; and normalizing attribute evaluation tags in each of the at least one tag class.

19. The system according to claim 17, wherein the operations further comprise:

scoring the attribute evaluation tag to obtain a score of the attribute evaluation tag;

selecting at least one attribute evaluation tag with a highest score as the attribute evaluation tag of the geographic region;

separately determining whether a score of each attribute evaluation tag of the geographic region is lower than a preset threshold;

in response to determining that a score of an attribute evaluation tag of the geographic region is lower than the preset threshold, eliminate the attribute evaluation tag from attribute evaluation tags of the geographic region; and in response to determining that a score of an attribute evaluation tag of the geographic region is not lower than the preset threshold, use the attribute evaluation tag as the attribute evaluation tag of the geographic region.

20. A non-transitory computer-readable storage medium for managing a region tag, configured with instructions executable by one or more processors to cause the one or more processors to perform operations comprising:

acquiring region identifier information of a geographic region;

acquiring an attribute evaluation tag of the geographic region by a user whose geographic position is in the geographic region and a time identifier of the attribute evaluation tag;

integrating the region identifier information, the attribute evaluation tag, and the time identifier of the attribute evaluation tag into a region tag of the geographic region;

clustering one or more region tags to generate a region time period tag of the geographic region for a time period based on that each of the one or more region tags comprises the region identifier information of the geographic region and a time identifier within the time period, wherein the region time period tag of the geographic region for the time period corresponds to a function attribute of the geographic region for the time period, the function attribute of the geographic region is descriptive of functions that the geographic region serves, the function attribute of the geographic region comprises a first function attribute of the geographic region for a first time period and a second function attribute of the geographic region for a second time period, the first function attribute is different than the second function attribute, and the first time period is different than the second time period; and outputting one or more region time period tags of the geographic region for one or more time periods, respectively.

\* \* \* \* \*